(12) United States Patent
Romanak et al.

(10) Patent No.: US 8,707,495 B2
(45) Date of Patent: Apr. 29, 2014

(54) SELF ADJUSTING RAMP

(75) Inventors: Matthew Romanak, Garfield Heights, OH (US); Dhananjay B. Gangakhedkar, Twinsburg, OH (US)

(73) Assignee: Cequent Consumer Products, Solon, OH (US)

( * ) Notice: Subject to any disclaimer, the term of this patent is extended or adjusted under 35 U.S.C. 154(b) by 5 days.

(21) Appl. No.: 13/272,499

(22) Filed: Oct. 13, 2011

(65) Prior Publication Data

US 2013/0091639 A1    Apr. 18, 2013

(51) Int. Cl.
*E01D 1/00* (2006.01)
*B65G 69/28* (2006.01)
*B66F 7/24* (2006.01)

(52) U.S. Cl.
CPC .................................... *B66F 7/243* (2013.01)
USPC ................... 14/69.5; 193/1; 193/38

(58) Field of Classification Search
CPC ...................................................... B66F 7/243
USPC ............ 14/69.5–72.5; 114/362; 193/1, 38, 41
See application file for complete search history.

(56) References Cited

U.S. PATENT DOCUMENTS

| | | | |
|---|---|---|---|
| 4,047,701 A * | 9/1977 | Glaesener | 256/13.1 |
| 5,538,308 A | 7/1996 | Floe | |
| 5,926,889 A | 7/1999 | Riesselmann et al. | |
| 6,842,930 B2 * | 1/2005 | Massey et al. | 14/71.3 |
| 7,100,231 B2 | 9/2006 | Peschmann | |
| 7,179,042 B1 | 2/2007 | Hartmann et al. | |
| 7,478,449 B2 * | 1/2009 | Williams | 14/69.5 |
| 7,488,025 B1 * | 2/2009 | Roberson | 296/61 |
| 7,926,139 B2 | 4/2011 | Metcalfe et al. | |
| 2001/0039687 A1 * | 11/2001 | Hahn et al. | 14/71.3 |
| 2002/0070079 A1 * | 6/2002 | Rosenwinkel | 182/49 |
| 2007/0199166 A1 | 8/2007 | Peschmann | |
| 2011/0252582 A1 | 10/2011 | Metcalfe et al. | |
| 2013/0043093 A1 * | 2/2013 | Smith | 182/21 |

* cited by examiner

*Primary Examiner* — Raymond W Addie
(74) *Attorney, Agent, or Firm* — McDonald Hopkins, LLC

(57) ABSTRACT

A ramp may include a frame having first and second end portions and at least one rung extending substantially between the frame and being positioned between the first and second end portions, the at least one rung forming at least a portion of a ramp surface. The ramp may further include a plate extending substantially between the frame and being positioned adjacent to at least one of the first and second end portions, and a lip pivotally attached to the plate at a pivot axis, wherein the pivot axis is non-load bearing.

34 Claims, 12 Drawing Sheets

SELF ADJUSTING RAMP

FIELD OF THE INVENTION

The present invention is generally related to a ramp and, more particularly, to a self-adjusting ramp.

BACKGROUND

Many transport vehicles are designed to transport freight, goods, merchandise, personal property, and other such cargo. Often, such transport vehicles utilize a load bed to haul such cargo, for example the load bed of a pick-up truck is often utilized to haul cargo. The load bed, however, is often elevated from the ground making it difficult to load and unload heavy objects from such load beds. Accordingly, operators will often utilize a ramp that may extend from the ground upwards to the load bed of the transporting vehicle to load heavy objects thereon.

Numerous types of ramps are used to assist in the loading and unloading of objects to and from transport vehicles. Particularly, trucks, vans, trailers and the like may utilize ramps to assist in the loading of rolling objects such as ATVs, motorcycles, lawnmowers, etc. One common type of ramp may consist of a plurality of rungs whereby each rung is separated from a successive rung by an open space. The rungs may be connected at or near the ends by rails. The successive rungs and the rails form a series of frame-like structures surrounding the central openings, similar to a ladder. Such a structure allows for loading and unloading of objects, such as ATVs, motorcycles, lawnmowers and etc. to and from the transport vehicle.

Ramps are designed to work up a specified maximum height to avoid the angle of the ramp from being overly steep. At the appropriate height, the ramp will be angled up from the ground level to the loading surface, such as the load bed of the transporting vehicle. This angle will change as the loading height of the transporting vehicle changes, or will change as the length of the ramp changes.

The surface of the ramp will often be at a different angle than the top loading surface of the transporting vehicle. Further, the ramp may utilize hooks on the side rails or a top plate that attaches the top of the ramp to the loading surface. This, however, results in the rolling load or object transitioning from the loading surface to the angled ramp or from the angled ramp to the loading surface. The fixed top plate or hooks on the ramp will not provide a smooth rolling surface onto the ramp that may sit at various angles. The load, therefore, must be pushed or pulled over this transitioned surface requiring extra force and instability when loading.

Therefore, there is a need for an improved ramp that reduces the transitioned surface that requires the rolling load or other object to be pulled or pushed when transitioning to and from the ramp.

SUMMARY

A ramp may include a frame having first and second end portions and at least one rung extending substantially between the frame and being positioned between the first and second end portions, the at least one rung forming at least a portion of a ramp surface. The ramp may further include a plate extending substantially between the frame and being positioned adjacent to at least one of the first and second end portions, and a lip pivotally attached to the plate at a pivot axis, wherein the pivot axis is non-load bearing.

In some embodiments, a ramp may include a frame having first and second end portions and at least one rung extending between at least a portion of the frame, the rung forming at least a portion of a ramp surface. The ramp may also include a plate extending substantially between the frame at either of the first and second end portions of the frame, and a lip pivotally attached to the plate and biasing downward relative to the ramp surface.

In some embodiments, a ramp may include a frame having a length, a ramp surface extending between the frame along at least a portion of the length. The ramp may further include a plate extending substantially between the frame, a lip pivotally attached to the plate at a pivot axis and a biasing member biasing the lip downward relative to the ramp surface, where the lip is capable of engaging at least one of a ground surface and a load bed of a vehicle.

In some embodiments, a ramp may include a frame having first and second end portions, at least one rung extending between at least a portion of the frame, the rung forming at least a portion of a ramp surface and a protective plate extending substantially between the frame at either of the first and second end portions of the frame. The ramp may further include a lip pivotally attached to the plate at a pivot axis and biasing downward relative to the ramp surface, where the protective plate is load bearing and the pivot axis is not load bearing.

In some embodiments, a ramp may include a frame having first and second end portions, and at least one rung extending between at least a portion of the frame, the rung forming at least a portion of a ramp surface. The ramp may further include a transition plate extending substantially between the frame at either of the first and second end portions of the frame, where at least a portion of the transition plate biases downward relative to the ramp surface.

BRIEF DESCRIPTION OF THE DRAWINGS

Operation of the invention may be better understood by reference to the following detailed description taken in connection with the following illustrations, wherein.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
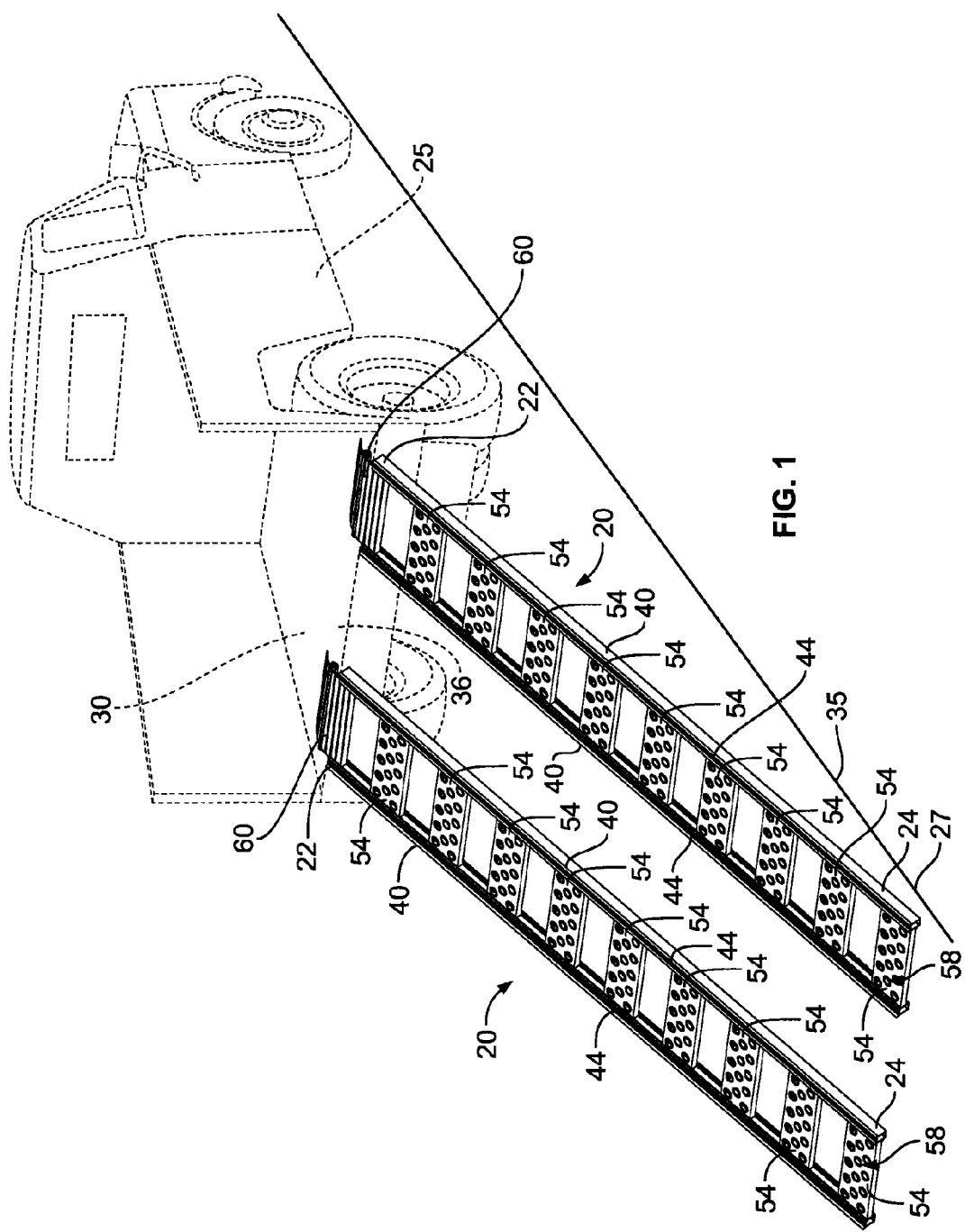
FIG. 1 is a perspective view of an embodiment of a self adjusting ramp operatively engaged with a transport vehicle and the ground surface.
Figure 2:
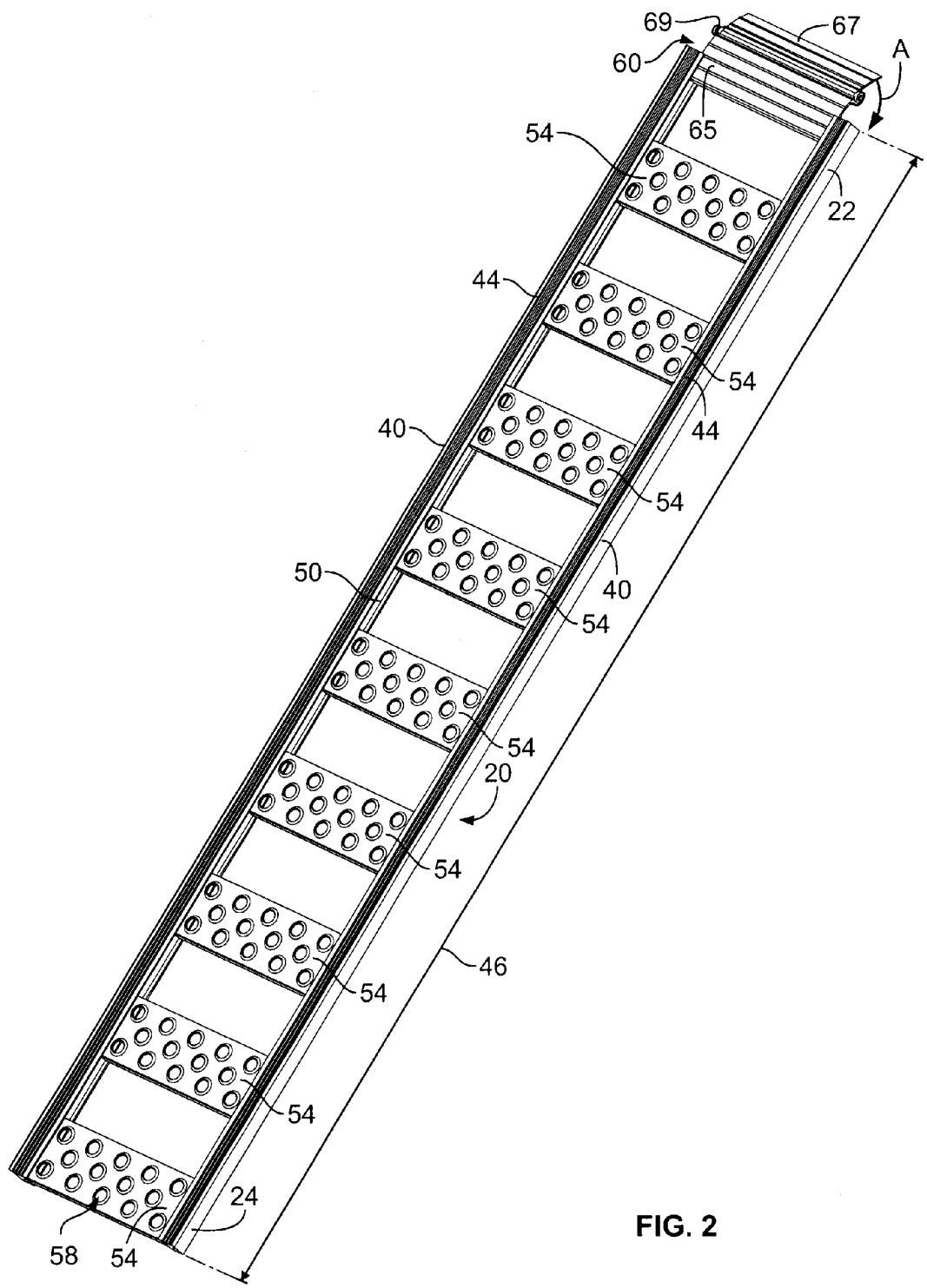
FIG. 2 is a perspective view of an embodiment of the self adjusting ramp.
Figure 3:
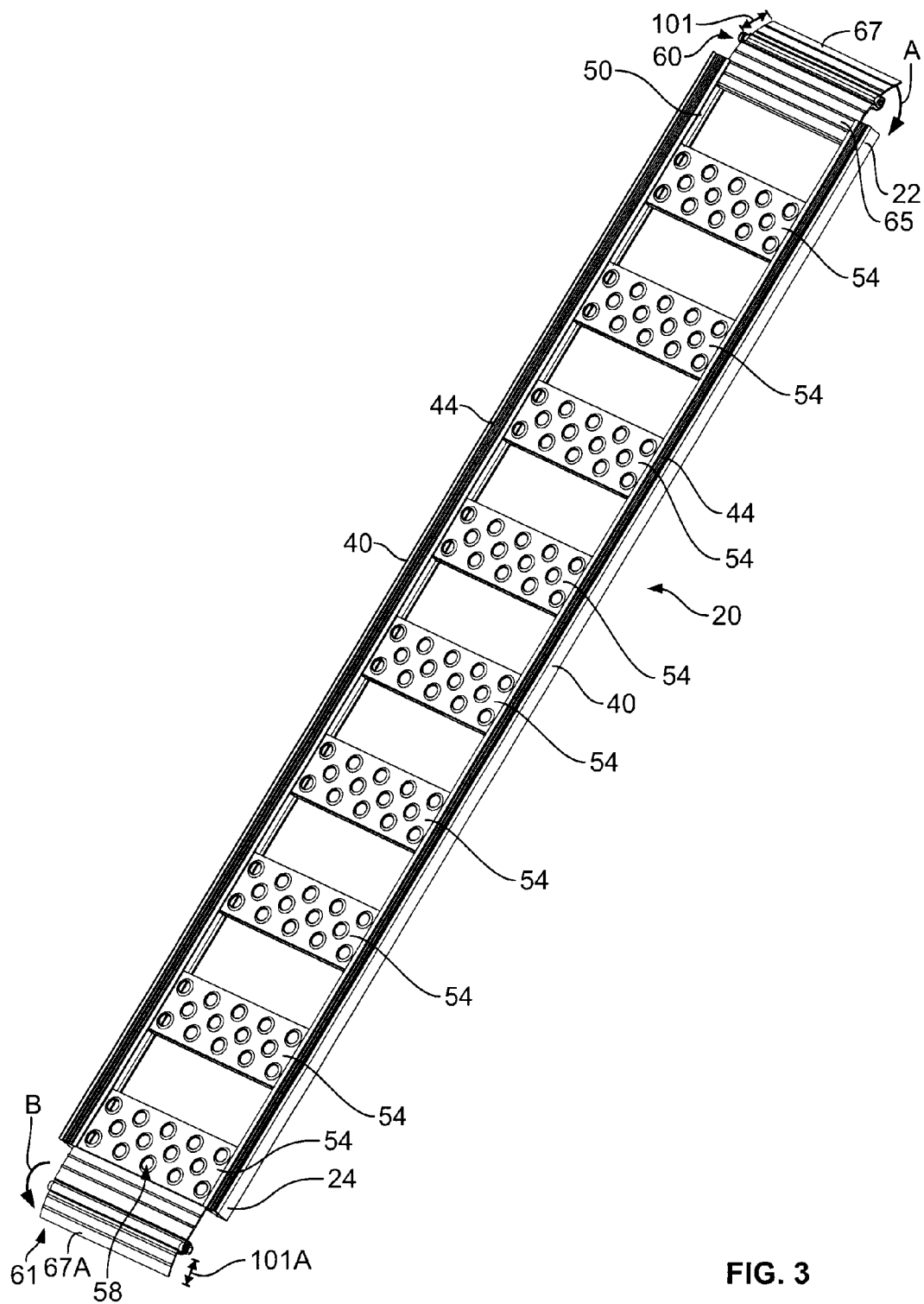
FIG. 3 is a perspective view of an alternative embodiment of a self adjusting ramp.
Figure 4:
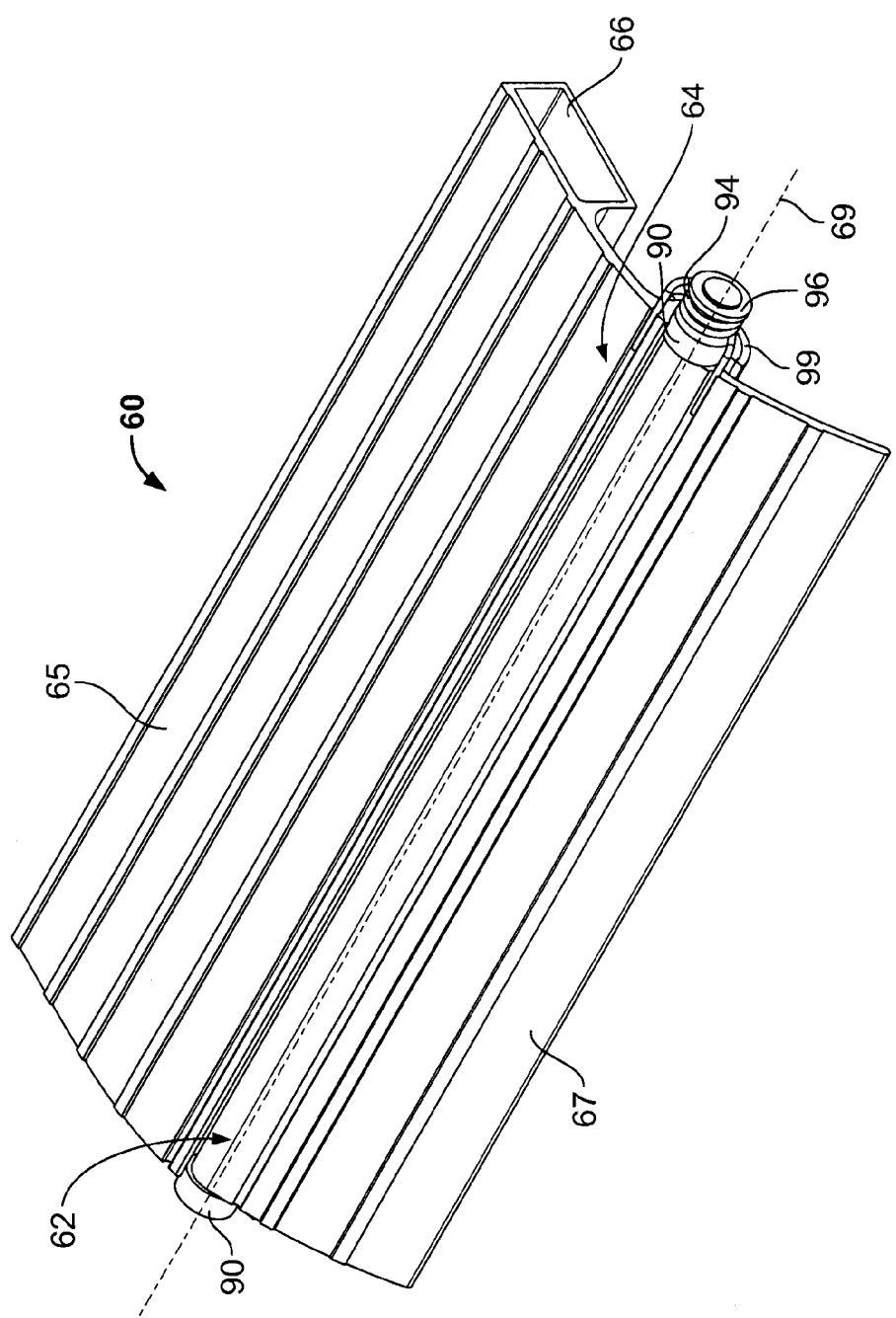
FIG. 4 is a perspective view of an embodiment of a transition plate of the self adjusting ramp.
Figure 5:
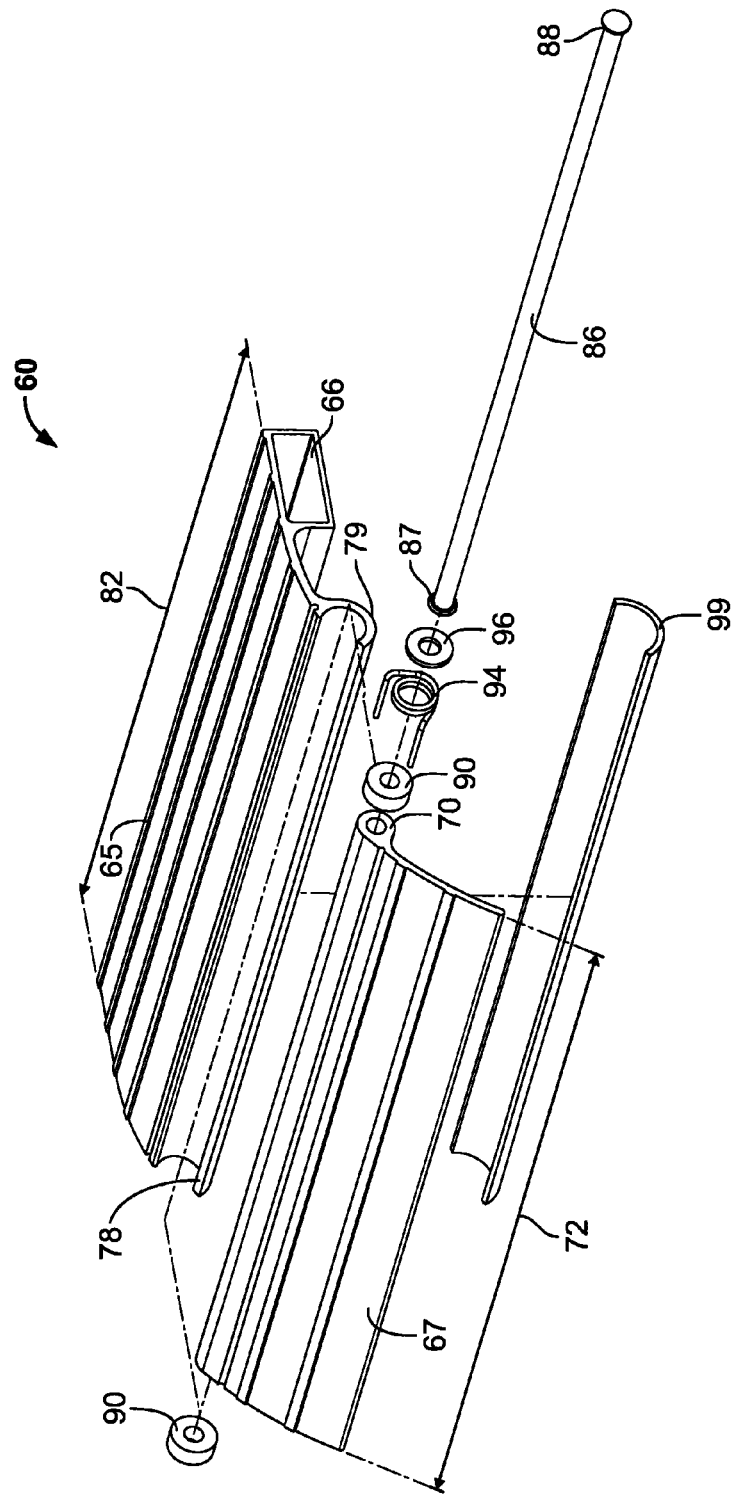
FIG. 5 is an exploded perspective view of the embodiment of the transition plate of the self adjusting ramp of FIG. 4.

A self-adjusting ramp 20 is illustrated in FIGS. 1-3. The ramp 20 may include a first end 22 and a second end 24. The ramp 20 may be configured to span from a transport vehicle 25 to and from a loading surface 27, such as the ground. By way of a non-limiting example, the first end 22 of the ramp 20 may engage a load bed 30 of the transport vehicle 25 and the second end 24 may engage the ground 35, an example of which is shown in FIG. 1. The ramp 20 may be of any appropriate shape, size, type or configuration, whereby it may extend at an appropriate angle between the transport vehicle 25, and specifically the load bed 30 thereof, and the loading surface 27 such as the ground 35. As shown in FIG. 1, the ramp 20 may extend from a rear portion 36 of the load bed 30 of the transport vehicle 25 to the ground 35 at an appropriate angle, such as by way of a non-limiting example between 9 and 28 degrees relative to the ground 35.

The length of ramp 20 may be selected for the type of transport vehicle 25 and the desired slope for loading and unloading. By way of a non-limiting example, if the transport vehicle 25 is a typical trailer a length of about six feet may provide a desirable slope, and if the transport vehicle 25 is a light pickup truck a length of about eight feet may provide a desirable slope. The present teachings, however, are not limited to any particular length ramp 20 and the ramp 20 may be of any appropriate length.

The ramp 20 may include at least one frame member 40. In an embodiment shown in FIGS. 1-3, the ramp 20 may include a pair of frame members 40, such frame members 40 being laterally disposed from each other at an appropriate distance. The present teachings, however, are not limited to the two frame members 40 shown. Any appropriate number of frame members 40 may be used. The frame members 40 may include a raised lip 44 that may extend at least a portion of a length 46 of the frame members 40. As shown in the drawings, the raised lip 44 may extend the entire length 46 of the frame members 40, or alternatively, may extend only a portion of the length 46 of the frame members 40. The raised lip 44 may be attached to the frame members 40 in any appropriate manner or may be integrally formed therewith. Moreover, while each frame member 40 is shown with a raised lip 44, only one such frame member 40 may include the raised lip 44 or none of the frame members 40 may include the raised lip 44. The raised lip 44 may be constructed and arranged to assist with preventing rolling loads being loaded or unloaded on the ramp 20 from moving off the side of the ramp 20.

Frame members 40 may be of any appropriate shape, such as by way of a non-limiting example frame members 40 may be a box beam with a pair of spaced apart portions forming a longitudinal channel in 50 which ends of cross members 54 may be located and mounted. The fastening of cross members 54 to frame member 40 may be accomplished in any appropriate manner, such as by way of a non-limiting example by pins, rivets, bolts with nuts affixed, welding or any other appropriate type of fastening. Alternatively, the cross members 54 may be integrally formed with the frame members 40.

The ramp 20 may include any appropriate number of cross members 54 mounted to the frame members 40 at predetermined distances from each other so that the cross members 54 may form a ramp surface 58 such that loads may be pushed or pulled up or down, as applicable, the ramp surface 58. By way of a non-limiting example, the loads may be manually pushed up or down the ramp surface 58 or a winch may be utilized for such. The spacing of cross members 54 may be selected such that it may be substantially less than the wheel diameter of any rolling load that may be loaded or unloaded on the ramp 20. This may allow the wheels to engage successive cross members 54 and "walk" up or down the ramp 20 without falling through. By way of a non-limiting example, as shown in FIGS. 1-3, the ramp 20 may include nine cross members 54 mounted to the frame members 40 at substantially even spacing. The ramp 20, however, is not limited any specific number of cross members 54. The appropriate number of cross members 54 may depend upon the length of the ramp 20 and the width of the cross members 54. Further, the cross members 54 may spaced from each other at different distances and may not be evenly spaced, as appropriate.

The ramp 20 may further include at least one transition plate/self-adjusting plate 60 that may be attached to the first end 22 and/or the second end 24 of the ramp 20. In one embodiment shown in FIGS. 1 and 2, the transition plate 60 may be attached to the first end 22 of the ramp 20 to engage the load bed 30 of the transport vehicle 25. In another embodiment shown in FIG. 3, the ramp 20 may include the transition plate 60 attached at the first end 22 that may engage the transport vehicle 25 and a second transition plate 61 attached to the second end 24 of the ramp 20 that may engage the ground 35. Alternatively, the ramp 20 may include a transition plate 60 at just the second end 24 of the ramp 20 that may engage the ground 35.

The transition plates 60, 61 may extend between the frame members 40 similar to the cross members 54 and may be mounted to the frame members 40 in any appropriate manner. By way of a non-limiting example, the transition plates 60, 61 may be mounted to the frame members 40 by a pin, rivets, bolts with nuts affixed, welding or any other type of fastening. In an alternative embodiment, the transition plates 60, 61 may be attached to at least one of the cross members 54 by any appropriate means, such as by way of a non-limiting example welding or may be integrally formed with the cross member 54. While transition plate 60 is shown and described as extending substantially entirely between the side rails that may form the frame, it should be appreciated that transition plate 60 may extend only partially therebetween. Additionally transition plate 60 may be a plurality of transition plates that together extend at least partially or entirely between the side rails.

While the transition plates 60, 61 may be of substantially similar construction, they are not limited to such. One of the transition plates 60 or 61 may be constructed as described below, the other one of the transition plates 60 or 61 may be constructed similar to the alternative embodiments described further below or may be any combination of such. However, only one of the transition plates 60 will be described in detail below, except as otherwise noted.

The transition plate 60 may be shaped to provide clearance underneath the ramp 20 to engage the loading surface 27 and/or the load bed 30 of the transport vehicle 25. The transition plate 60 may include a generally rounded shape surface 62 on a top surface 64 thereof, which may provide a substantially continuous surface for a rolling load. This may substantially eliminate or reduce the transition surface when transitioning to and from the ramp 20, which may result in less force required for the rolling load or other object to be pulled or pushed to and from the ramp 20. More specifically, the generally rounded shape surface 62 on the top surface 64 may make the transition from the ramp 20 to the load bed 30 of the transport vehicle 25 more continuous such that the load may roll over such with less effort.

The transition plate 60 may include a top or protective plate 65 and a pivoting transition/extension plate or lip 67 pivotally attached to the top plate 60 at a pivot axis 69. The top plate 65 may include a channel 66 that may be used to attach the transition plate 60, or more specifically, the top plate 65 to the frame members 40 by any appropriate means. Alternatively, the top plate 65 may be secured to one of the cross members 54 by any appropriate manner, or may be integrally formed with the cross member 54. The lip 67 may pivot relative to the top plate 65 at the pivot axis 69. Further, the lip 67 may be biased downward relative to the ramp surface 58, as shown by arrow A of FIG. 2. More specifically, the lip 67 may be biased in a downward position, angled at least as far down as needed for the maximum height specified for the applicable ramp 20. The pivoting lip 67 may adjust to the angle of the ramp 20 relative to the loading surface 27 and/or transport vehicle 25 as applicable and the biasing of the lip 67 may hold the lip 67 against the loading surface 27 and/or transport vehicle 25 as applicable. This may provide a smooth transition from the ramp 20 to the applicable loading surface 27 and/or transport vehicle 25. A rolling load may move easily onto or off the ramp 20 at any height (or angle) within the design limits of the ramp 20. Further, the ramp 20 may stay in place and require less effort than a ramp with mismatched top plate angle to loading surface.

The lip 67 may be pivotally attached to the top plate 65 by any appropriate manner at the pivot axis 69. By way of a non-limiting example, the lip 67 may include a tubular member 70 that may extend substantially a length 72 of the lip 67. The tubular member 70 may be attached to the lip 67 in any appropriate manner, such as by welding, or may be integrally formed therewith. The top plate 65 may include a channel 78 which may extend substantially a length 82 of the top plate 65. The channel 78 may be attached to the top plate 65 in any appropriate manner, such as by welding, or may be integrally formed therewith. While the tubular member 70 and channel 78 are shown extending substantially the length 72, 82 of the lip 67 and the top plate 65, respectively, they are not required to be so. The tubular member 70 and channel 78 may be discontinuous or may extend only a portion of the length 72, 82 of the lip 67 and top plate 65.

The tubular member 70 may be shaped and sized to engage with the channel 78 to pivotally secure the lip 67 with the top plate 65 such that the lip 67 may pivot relative to the top plate 65. By way of a non-limiting example, the tubular member 70 may pivotally fit within the channel 78. Further, the tubular member 70 and/or the channel 78 may be shaped and formed such that the engagement thereof may limit pivoting movement of the lip 67 when the top plate 65 is not in contact with loading surface 27 and/or transport vehicle 25, as applicable.

The engagement of the channel 78 and the tubular member 70 may result in the pivot of the transition plate 60 being protected from the load of the cargo being applied thereto. By way of a non-limiting example, when using the transition plate 60 the load of the cargo to be pulled or pushed up or down the ramp 20, as applicable, may not be applied to the pivot axis 69. This may protect the pivot axis 69 from damage and may extend the life of the ramp 20. Specifically, the pivot axis 69 of the transition plate 60 is non-loading bearing, including, without limitation when the ramp 20 is used to load cargo to and from the transport vehicle 25 to and from the loading surface 27.

The transition plate 60 may include a rivet or pivot shaft 86 that may be shaped and sized to engage the tubular member 70 to pivotally secure the lip 67 to the top plate 65 forming at least a portion of the pivot axis 69. The pivot shaft 86 may include first and second ends 87, 88 such that the first and second ends 87, 88 may extend beyond the tubular member 70 when inserted therein or may be held entirely within the tubular member 70. At least a portion of the pivot shaft 86 being held within the tubular member 70 may prevent a load from being applied to the pivot shaft 86 when the ramp 20 is used to load and unload the transport vehicle 25. This may result in the pivot shaft 86 being a non-load bearing surface.

The transition plate 60 may further include a bushing or spacer 90 that may be attached to the channel 78 in any appropriate manner, such as by way of a non-limiting exampling, welding, fastening or using adhesives. Attaching the bushing or spacer 90 may hold pivot shaft 86 in place and help with the pivoting of the lip 67 relative to the top plate 65. Additionally, the bushing 90 may help position the pivot shaft 86 within the tubular member 70 when securing the pivot shaft 86 within the tubular member 70 and may be attached at the first and second ends 87, 88 of the pivot shaft 86. In a non-limiting example, a pair of bushings 90 may be used and may be attached to the first and second ends 87, 88 of the pivot shaft 86.

The transition plate 60 may further include a biasing member 94 that may be secured to the pivot shaft 86 and may be held within the tubular member 70. Alternatively, the biasing member 94 may be external to the tubular member 70, or a portion of the biasing member 94 may extend within the tubular member 70 and a portion of the biasing member 94 may be external to the tubular member 70. Biasing member 94 may bias lip 67 in a downward direction. The biasing member 94 may be any appropriate biasing member, such as by way of a non-limiting example a coil spring, helical spring, or torsion spring. Further, the transition plate may include a washer 96 that may engage the pivot shaft 86 and be positioned between the biasing member 94 and either of the first and second ends 87, 88 of the pivot shaft 86.

The transition plate 60 may include a pad 99 that may be attached to an underside of the transition plate 60. The pad 99 may be made of a resilient material so as to protect the transport vehicle 25, or more specifically, the load bed 30 of the transport vehicle 25, or the loading surface 27 from the engagement of the ramp 20 therewith. Specifically, the pad 99 may be attached by any appropriate means, such as by way of a non-limiting example, adhesives, fasteners, or the like, to an underside 79 of the channel 78.

In operation, the biasing member 94 may bias the lip 67 downward relative to the ramp surface 58. Therefore, when the transition plate 60, or more particularly, the top plate 65 engages either one of the loading surface 27 and/or the transport vehicle 25, the pivotability of the lip 67 may allow the lip 67 to adjust to angle of the ramp 20 relative to the loading surface 27 and/or transport vehicle 25, as applicable. The biasing member 94 may bias the lip 67 downward relative to the ramp surface 58, which may hold the lip 67 against the loading surface 27 and/or transport vehicle 25 as applicable regardless of the load that may be applied to the ramp 20. This may provide a generally smooth transition from the ramp 20 to the applicable loading surface 27 and/or transport vehicle 25. A rolling load may move easily onto or off the ramp 20 at any height (or angle) within the design limits of the ramp 20.

Additional embodiments of the ramp 20 according the present teachings are described below. In the descriptions, all of the details and components may not be fully described or shown. Rather, some of the features or components are described and, in some instances, differences with the above-described embodiment may be pointed out. Moreover, it should be appreciated that these additional embodiments may include elements or components utilized in the above-described embodiment although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a desired ramp without departing from the spirit and scope of the present invention.

As shown in FIG. 3, the ramp 20 may include both the transition plate 60 and the second transition plate 61. In this embodiment, the transition plate 60 may be located on the first end 22 of the ramp 20 and the second transition plate 61 may be located at the second end 24 of the ramp 20, although the reverse may also occur. The transition plate 60 may therefore engage the transport vehicle 25 as indicated above and the second transition plate 61 may engage the ground 35. This may provide a ramp 20 that has two generally rounded shapes 62 on the top surfaces 64 of both the transition plates 60, 61, which may provide a substantially continuous surface for a rolling load both onto and off of the ramp 20. This may eliminate or reduce the transition surface when transitioning to and from the ramp 20, which may result in less force required for the rolling load or other object to be pulled or pushed to and from the ramp 20.

In this embodiment, however, the lip 67 of the transition plate 60 may pivot generally clockwise downward in the view depicted in FIG. 3. toward the ramp surface 58 as shown by arrow A whereas the lip 67A of the second transition plate 61 may pivot counter-clockwise generally parallel to the ramp surface 58 as shown by the arrow B. Further, the lip 67 may have a width 101 that may be generally longer than the width 101A of the lip 67A of the second transition plate 65, although, the widths 101, 101A may be substantially similar.

Figure 6:
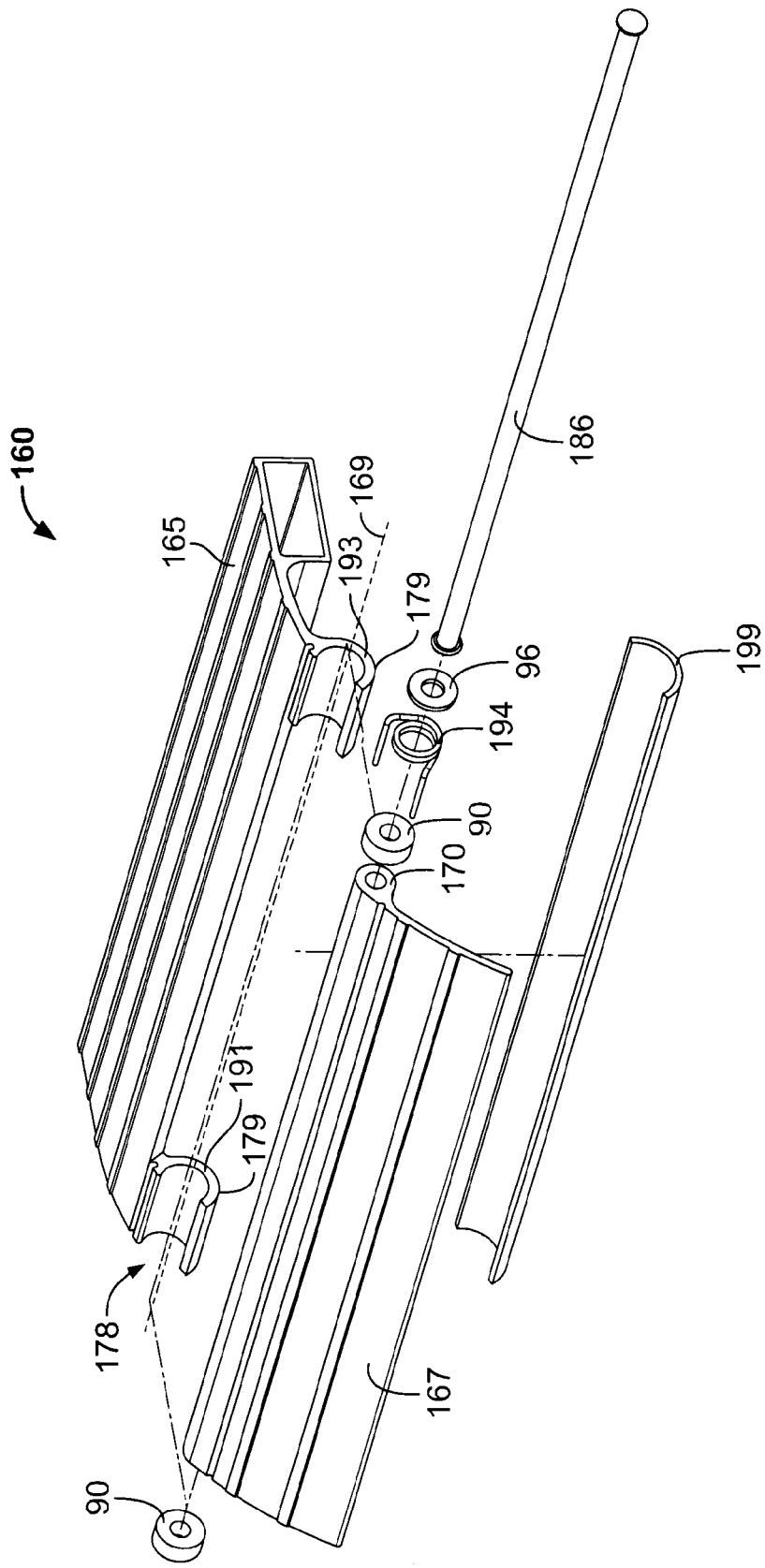
FIG. 6 is an exploded perspective view of an embodiment of a transition plate of the self adjusting ramp.

Another embodiment of the transition plate 160 is shown in FIG. 6. The transition plate 160 may include a top plate 165 and a lip 167 that is pivotally attached to the top plate 165. The top plate 165 may include a discontinuous channel 178 alternative to the substantially continuous channel 78 of the transition plate 60. The discontinuous channel 178 may include first and second clips or fingers 191, 193. The lip 167 may include a tubular member 170 that may be generally continuous, or in the alternative may be of a substantially similar discontinuous shape as the channel 178 so as to pivotally engage such. The tubular portion 170 of the lip 167 may pivotally engage the first and second clips 191, 193 such that lip 167 may pivot relative to the top plate 165. The transition plate 160 may further include a pivot shaft 186 that is capable of a extending through the tubular member 170 to form at least a portion of a pivot axis 169 and may secure the top plate 165 with the lip 167. The tubular member 170 may protect the pivot axis 169 and the pivot shaft 186 from any loads being applied thereto such that the pivot axis 169 and the pivot shaft 186 are non-load bearing.

The transition plate 160 may further include a biasing member 194 that may be operatively engaged with the pivot shaft 186 and may biasly engage the lip 167. The biasing member 194 may bias the lip 167 downward relative to ramp surface 58 of the cross members 54. The transition plate 160 may otherwise operate as described above and may be positioned at the first end 22 of the ramp 20 to engage the load bed 30 of the transport vehicle 25 or the second end 22 of the ramp 20 to engage the ground 35 or both. Finally, the transition plate 160 may include a pad 199 of resilient material that may be attached to an underside 179 of the discontinuous channel 178 to protect the transport vehicle 25 or loading surface 27 as applicable.

Figure 7:
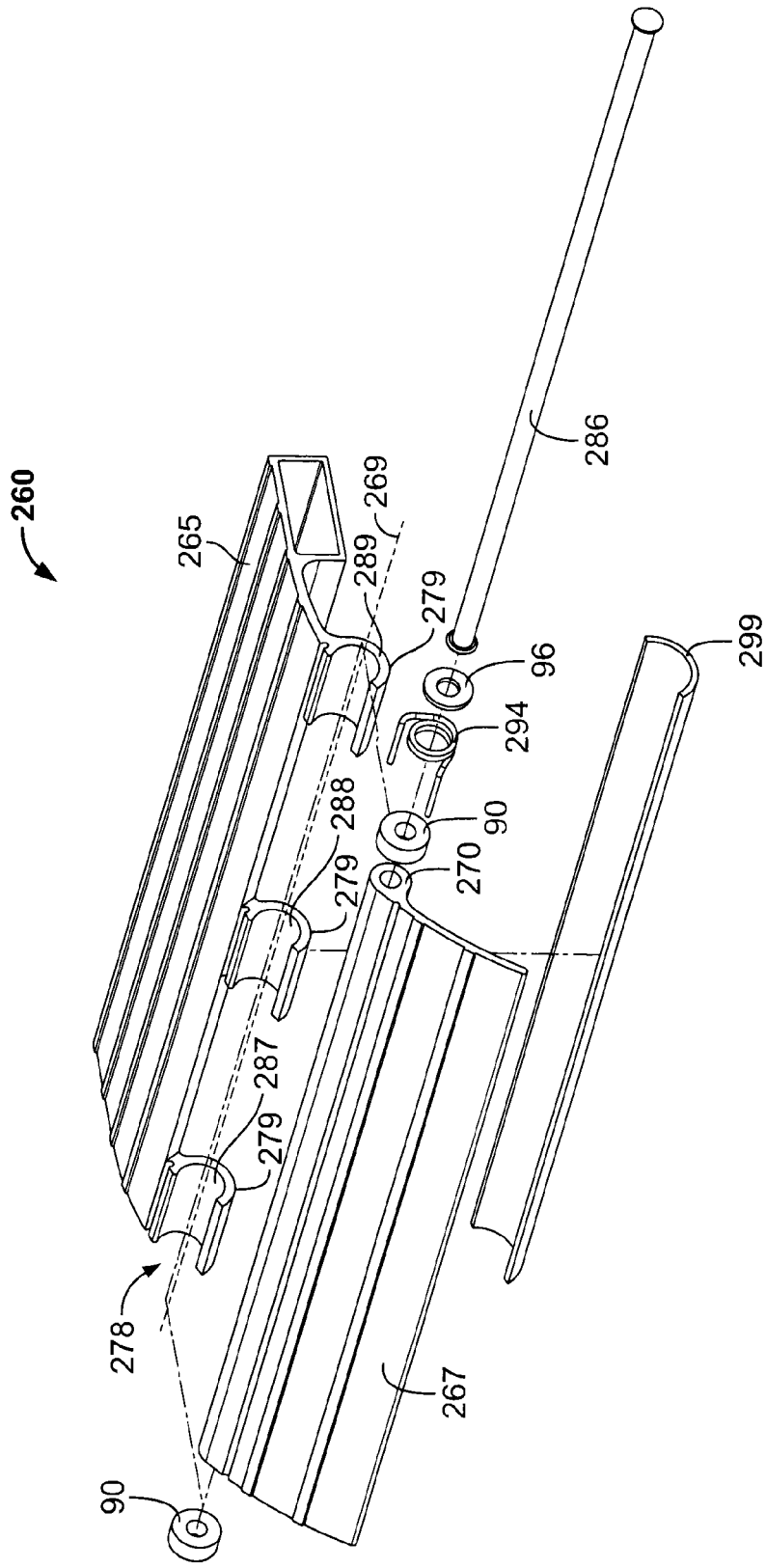
FIG. 7 is an exploded perspective view of an embodiment of a transition plate of the self adjusting ramp.

An alternative embodiment of the transition plate 260 is shown in FIG. 7. The transition plate 260 may include a top plate 265 and a lip 267 that is pivotally attached to the top plate 265. The top plate 265 may include a discontinuous channel 278. The discontinuous channel 278 may include first, second and third clips or fingers 287, 288, and 289. The lip 267 may include a tubular member 270 that may be generally continuous, or in the alternative may be of a substantially similar discontinuous shape as the channel 278. The tubular portion 270 of the lip 267 may pivotally engage the first, second and third clips or fingers 287, 288, and 289 such that the lip 267 may pivot relative to the top plate 265. The transition plate 260 may further include a pivot shaft 286 that is capable of a extending through the tubular member 270 to form at least a portion of a pivot axis 269 and may secure the top plate 265 with the lip 267. The tubular member 270 may protect the pivot axis 269 and the pivot shaft 286 from any loads being applied thereto such that the pivot axis 269 and the pivot shaft 286 are non-load bearing.

The transition plate 260 may further include a biasing member 294 that may be operatively engaged with the pivot shaft 286 and may biasly engage the lip 267. The biasing member 294 may bias the lip 267 downward relative to ramp surface 58 of the cross members 54. The transition plate 260 may otherwise operate as described above and may be positioned at the first end 22 of the ramp 20 to engage the load bed 30 of the transport vehicle 25 or the second end 22 of the ramp 20 to engage the ground 35 or both. Finally, the transition plate 260 may include a pad 299 of resilient material that may be attached to an underside 279 of the discontinuous channel 278 to protect the transport vehicle 25 or loading surface 27 as applicable.

Figure 8:
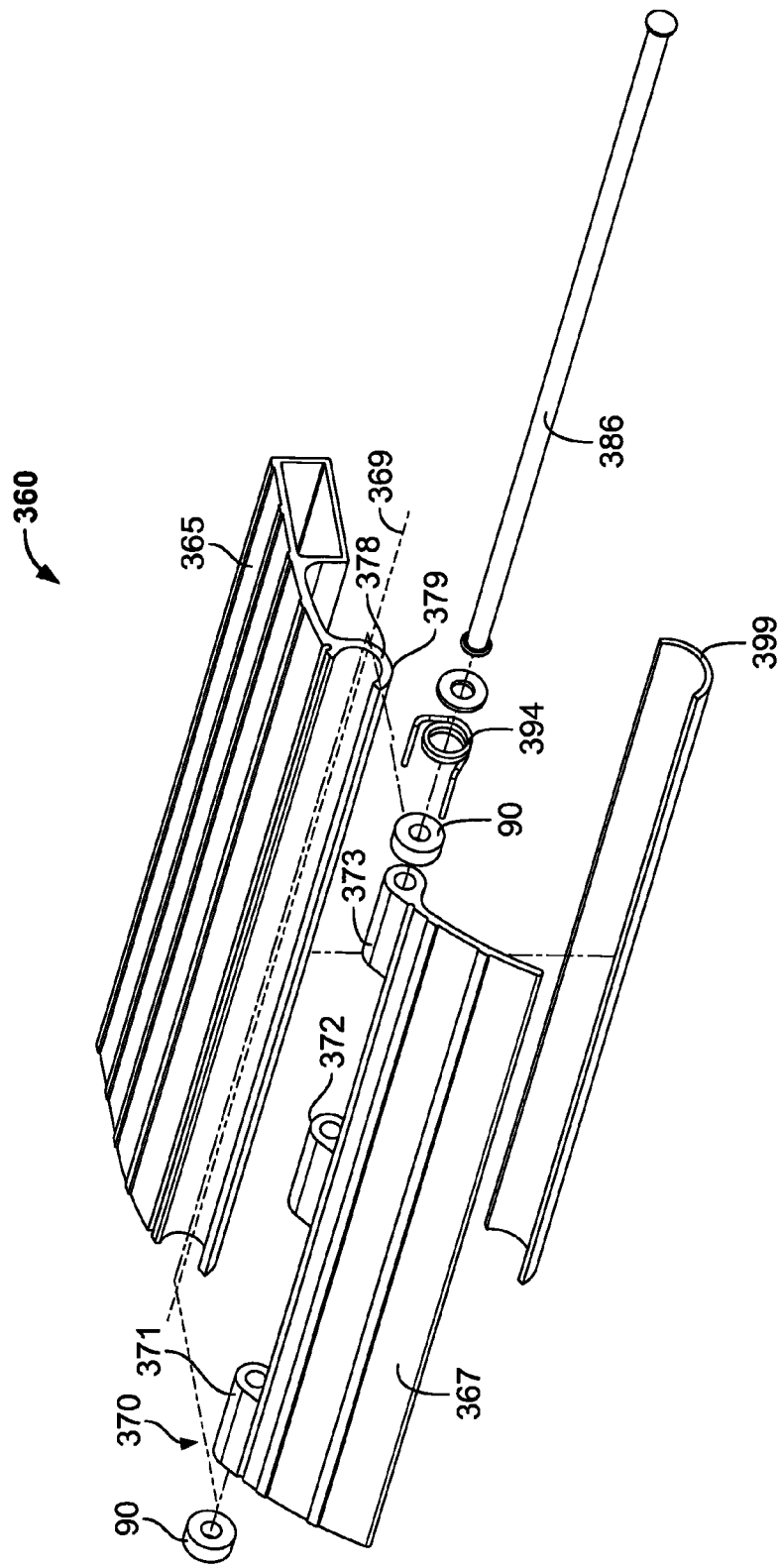
FIG. 8 is an exploded perspective view of an embodiment of a transition plate of the self adjusting ramp.

Another alternative embodiment of a transition plate 360 is shown in FIG. 8. The transition plate 360 may include a top plate 365 and a lip 367 that may include a discontinuous tubular member 370 alternative to the generally continuous tubular member 70. The discontinuous tubular member 370 may include first, second and third tube portions 371, 372, and 373. The top plate 365 may include a channel 378 that may be generally continuous, or in the alternative may be of a substantially similar discontinuous shape as the tubular member 370. The channel 378 of the lip 367 may pivotally engage the first, second and third tube portions 371, 372, and 373 such that lip 367 may pivot relative to the top plate 365. The transition plate 360 may further include a pivot shaft 386 that is capable of a extending through at least one of, or by way of a non-limiting example, all of the first, second and third tube portions 371, 372, and 373 to form at least a portion of a pivot axis 369 and may secure the top plate 365 with the lip 367.

The transition plate 360 may further include a biasing member 394 that may be operatively engaged with the pivot shaft 386 and may biasly engage the lip 367. The biasing member 394 may bias the lip 367 downward relative to ramp surface 58 of the cross members 54. The transition plate 360 may otherwise operate as described above and may be positioned at the first end 22 of the ramp 20 to engage the load bed 30 of the transport vehicle 25 or the second end 22 of the ramp 20 to engage the ground 35 or both. Finally, the transition plate 360 may include a pad 399 of resilient material that may be attached to an underside 379 of the channel 378 to protect the transport vehicle 25 or loading surface 27 as applicable.

Figure 9:
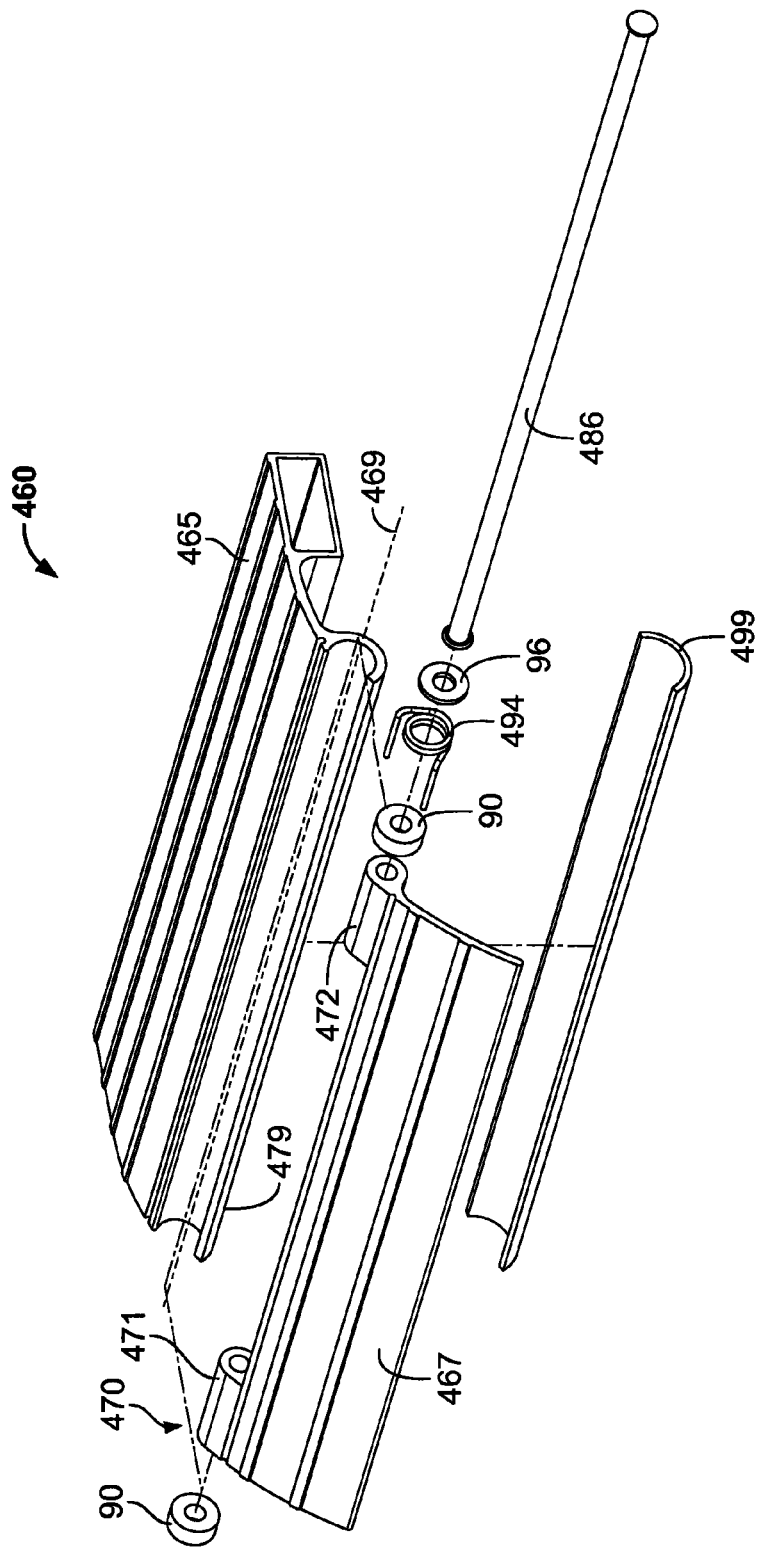
FIG. 9 is an exploded perspective view of an embodiment of a transition plate of the self adjusting ramp.

Another alternative embodiment of a transition plate 460 is shown in FIG. 9. The transition plate 460 may include a top plate 465 and a lip 467 that may include a discontinuous tubular member 470. The discontinuous tubular member 470 may include first and second tube portions 471, 472. The plate 465 may include a channel 478 that may be generally continuous, or in the alternative may be of a substantially similar discontinuous shape as the tubular member 470. The channel 478 of the lip 467 may pivotally engage the first and second tube portions 471 and 472 such that lip 467 may pivot relative to the top plate 465. The transition plate 460 may further include a pivot shaft 486 that is capable of a extending through at least one of, or by way of a non-limiting example, all of the first and second tube portions 471, 472 to form at least a portion of a pivot axis 469 and may secure the top plate 465 with the lip 467.

The transition plate 460 may further include a biasing member 494 that may be operatively engaged with the pivot shaft 486 and may biasly engage the lip 467. The biasing member 494 may bias the lip 467 downward relative to ramp surface 58 of the cross members 54. The transition plate 460 may otherwise operate as described above and may be positioned at the first end 22 of the ramp 20 to engage the load bed 30 of the transport vehicle 25 or the second end 22 of the ramp 20 to engage the ground 35 or both. Finally, the transition plate 460 may include a pad 499 of resilient material that may be attached to an underside 479 of the channel 478 to protect the transport vehicle 25 or loading surface 27 as applicable.

Figure 10:
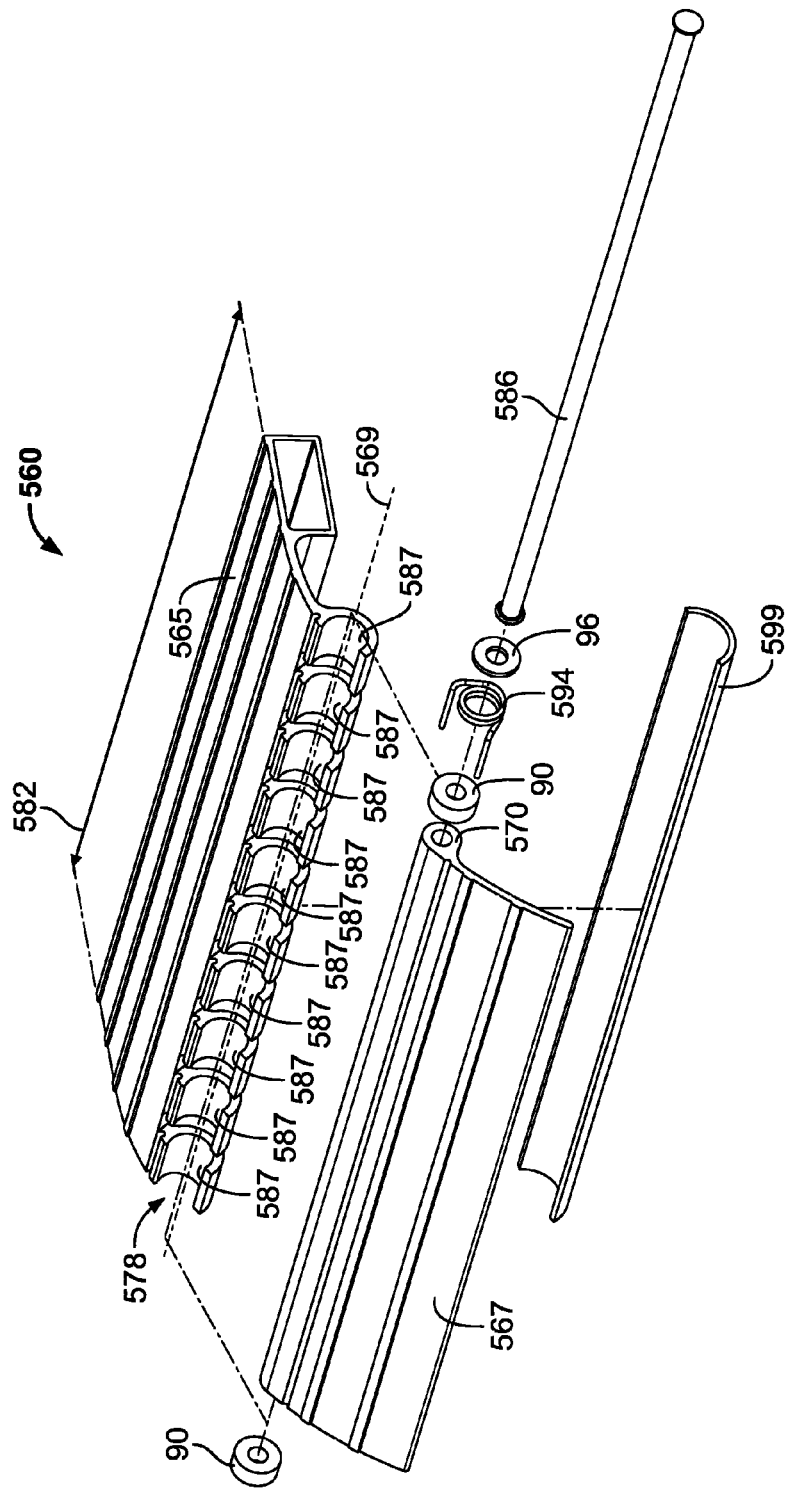
FIG. 10 is an exploded perspective view of an embodiment of a transition plate of the self adjusting ramp.

Another alternative embodiment of a transition plate 560 is shown in FIG. 10. The transition plate 560 may include a top plate 565 and a lip 567 that is pivotally attached to the top plate 565. The top plate 565 may include a discontinuous channel 578. The discontinuous channel 578 may include a plurality of clips 587 extending substantially the entire length 582 of the top plate 565. Alternatively, however, the clips 587 may extend only a portion of the length 582 of the top plate 565. The lip 567 may include a tubular member 570 that may be generally continuous, or in the alternative may be of a substantially similar discontinuous shape as the channel 578. The tubular portion 570 of the lip 567 may pivotally engage the plurality of clips 587 such that the lip 567 may pivot relative to the top plate 565. The transition plate 560 may further include a pivot shaft 586 that is capable of a extending through the tubular member 570 to form at least a portion of a pivot axis 569 and may secure the top plate 565 with the lip 567. The tubular member 570 may protect the pivot axis 569 and the pivot shaft 586 from any loads being applied thereto such that the pivot axis 569 and the pivot shaft 586 are non-load bearing.

The transition plate 560 may further include a biasing member 594 that may be operatively engaged with the pivot shaft 586 and may biasly engage the lip 567. The biasing member 594 may bias the lip 567 downward relative to ramp surface 58 of the cross members 54. The transition plate 560 may otherwise operate as described above and may be positioned at the first end 22 of the ramp 20 to engage the load bed 30 of the transport vehicle 25 or the second end 22 of the ramp 20 to engage the ground 35 or both. Finally, the transition plate 560 may include a pad 599 of resilient material that may be attached to an underside 579 of the discontinuous channel 578 to protect the transport vehicle 25 or loading surface 27 as applicable.

Figure 11:
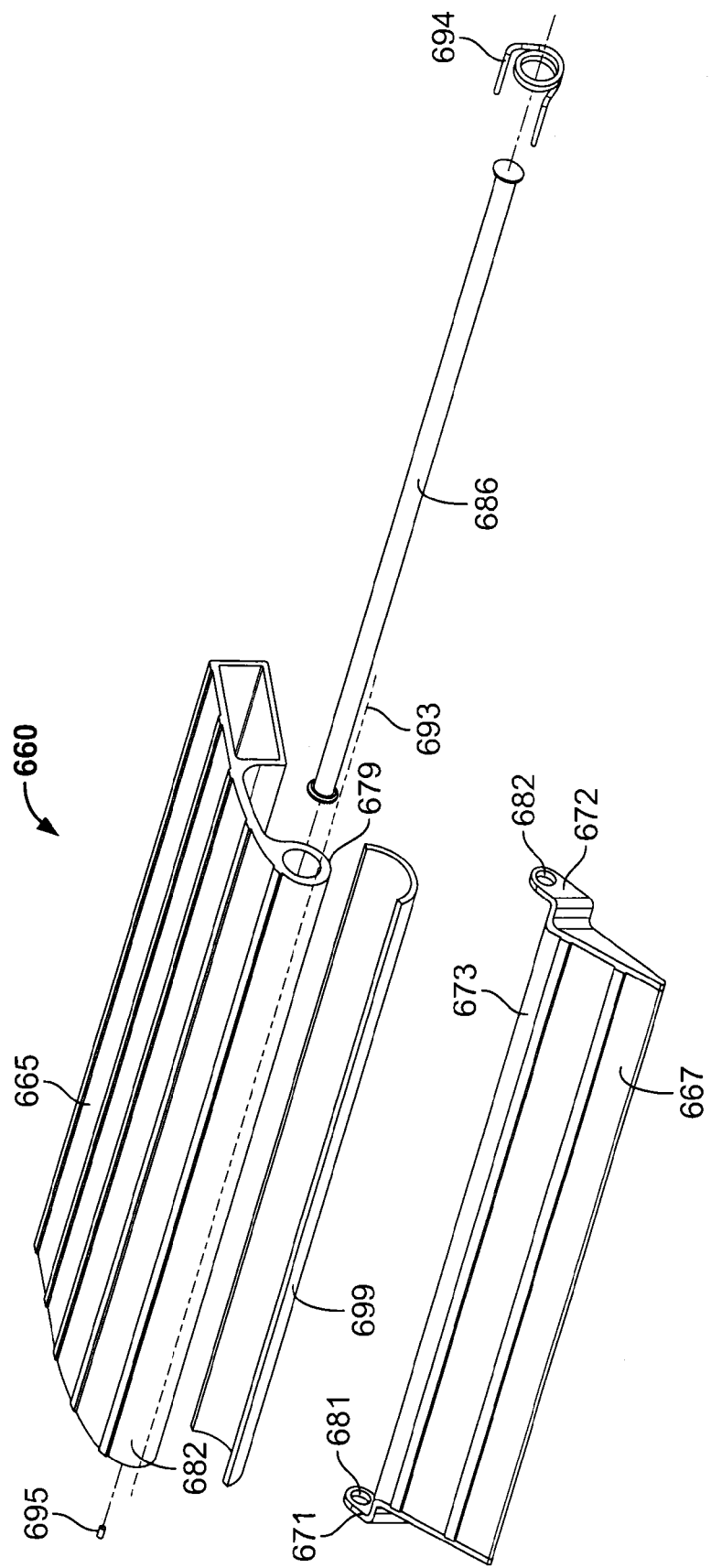
FIG. 11 is an exploded perspective view of an embodiment of a transition plate of the self adjusting ramp.

Another alternative embodiment of a transition plate 660 is shown in FIG. 11. The transition plate 660 may include a top plate 665 and a lip 667 pivotally attached to the top plate 667. The top plate 665 may include a tubular member 682 and the lip 667 may include first and second tabs 671, 672 extending from a rearward portion 673 of the lip 667; the first and second tabs 671, 672 having first and second apertures 681, 682, respectively. The transition plate 660 may further include a pivot shaft 686 that is capable of a extending through at least a portion, or by way of a non-limiting example, all of the tubular member 682. The tabs 691, 692 may pivotally engage the pivot shaft 686 such that the lip 667 may be pivotally attached to the top plate 665. Specifically, the pivot shaft 686 may be pivotally secured to the first and second apertures 681, 682 of the first and second tabs 671, 672. This may form a pivot axis 693. The tubular member 682 may protect the pivot axis 693 and the pivot shaft 686 from any loads being applied thereto such that the pivot axis 694 and the pivot shaft 686 are non-load bearing.

The transition plate 660 may include a biasing member 694 that is capable of biasing the lip 667 downward relative to the ramp surface 58. Finally, a pin 695 may engage the pivot shaft 698 to pivotally secure the lip 667 to the top plate 665 such that the lip 667 may be biased downward relative to the ramp surface 58.

The transition plate 660 may otherwise operate as described above and may be positioned at the first end 22 of the ramp 20 to engage the load bed 30 of the transport vehicle 25 or the second end 22 of the ramp 20 to engage the ground 35 or both. Finally, the transition plate 660 may include a pad 699 of resilient material that may be attached to an underside 679 of the tubular member 682 to protect the transport vehicle 25 or loading surface 27 as applicable.

Figure 12:
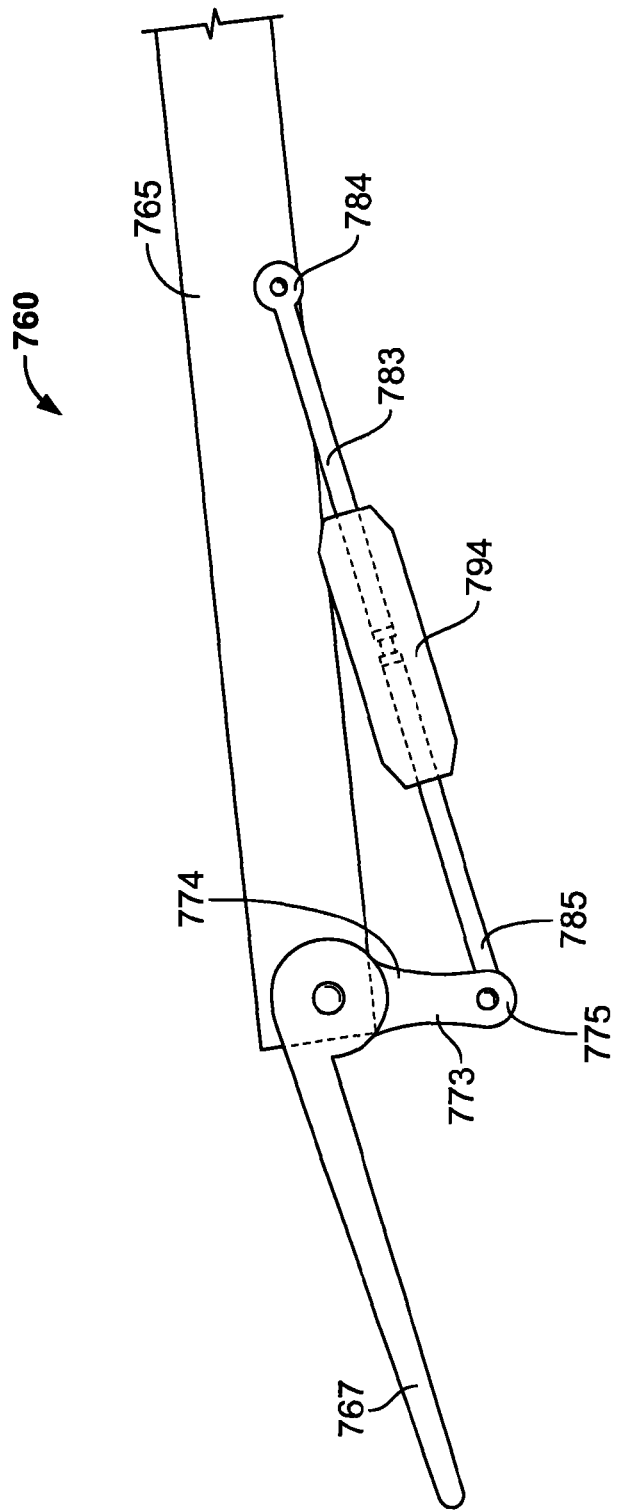
FIG. 12 is an elevation view of an embodiment of a transition plate of the self adjusting ramp.

Another alternative embodiment of a transition plate 760 is shown in FIG. 12. The transition plate 760 may include a top plate 765 and a lip 767 pivotally attached to the top plate 765. The transition plate 760 may include a pair of links 773 (although only one is shown in the drawings) on each side of the transition plate 760; the links 773 having first and second end portions 774, 775. The first end portion 774 may be pivotally attached to the lip 767. The transition plate 760 may further include a pair of arms 783 (although only one is shown in the drawings) on each side of the transition plate 760. The pair of arms 783 may include first and second ends 784, 785. The first end 784 of the arm 783 may be attached to the top plate 765 and the second end 785 may be attached to the second end 775 of the link 773. This may result in the lip 767 being pivotally attached to the top plate 765 such that the pivot is on the outside of the transition plate 760. The pivot thereof, therefore, does not bear any loads when a load passes over the transition plate 760.

The arms 783 may include a biasing member 794 that may bias the lip 767 downward relative to the ramp surface 58. The biasing member 794 may be any appropriate biasing member, such as by way of a non-limiting example, a spring, pneumatic spring, or hydraulic spring. The transition plate 760 may otherwise operate as described above and may be positioned at the first end 22 of the ramp 20 to engage the load bed 30 of the transport vehicle 25 or the second end 22 of the ramp 20 to engage the ground 35 or both.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. A ramp comprising:
    a frame having longitudinally spaced first and second end portions;
    at least one rung extending transversely relative to and substantially between the frame, wherein the at least one rung is positioned between the first and second end portions, the at least one rung forming at least a portion of a ramp surface;
    a plate extending at least partially between side rails of the frame and being positioned adjacent to at least one of the first and second end portions, wherein the plate is positionable to an operative position whereby the plate rests on a mounting surface; and
    a lip pivotally attached to the plate at a pivot axis, wherein a majority portion of the pivot axis is non-load bearing.

2. The ramp of claim 1, wherein the plate is fixedly attached with the frame.

3. The ramp of claim 1, wherein the plate and lip form a portion of the ramp surface.

4. The ramp of claim 1, wherein the pivot axis does not form a portion of the ramp surface.

5. The ramp of claim 1, wherein the lip is positioned at the first end of the ramp and is pivotably biased downward relative to the ramp surface.

6. The ramp of claim 5 further comprising:
    a second plate extending at least partially between the side rails of the frame at the second end portion; and
    a second lip pivotally attached to the second plate at a second pivot axis, wherein the second pivot axis is non-load bearing.

7. The ramp of claim 6, wherein the second lip is pivotably biased downward relative to the ramp surface.

8. The ramp of claim 7, wherein the lip has a first length and the second lip has a second length, the first length being greater than the second length.

9. The ramp of claim 8, wherein the lip biases downward to engage a load bed of a vehicle and the second lip biases downward to engage a ground surface.

10. The ramp of claim 7, wherein the first lip has a first degree of motion and the second lip has a second degree of motion wherein the first degree of motion is different from the second degree of motion.

11. The ramp of claim 7, wherein the first lip pivots in a first rotational direction toward a generally downward position relative to the ramp surface and the second lip pivots in a second rotational direction, opposite the first rotational direction, toward a generally parallel position relative to the ramp surface.

12. The ramp of claim 1, wherein the plate extends substantially an entire width of the frame.

13. The ramp of claim 1, wherein the lip is free to pivot in at least one direction when the plate is in the operative position resting on the mounting surface.

14. A ramp comprising:
    a frame having longitudinally spaced first and second end portions;
    at least one rung extending transversely relative to and between at least a portion of the frame, the rung forming at least a portion of a ramp surface;
    a plate extending at least partially between side rails of the frame at either of the first and second end portions of the frame; and
    a lip pivotally attached to the plate and biased downward relative to the ramp surface, wherein the biasing is independent of a position of the ramp.

15. The ramp of claim 14 further comprising a biasing member operatively coupled to the lip wherein the biasing member biases the lip downward relative to the ramp surface.

16. The ramp of claim 15, wherein the biasing member comprises one of a coil spring, helical spring, torsion spring, pneumatic spring, and hydraulic spring.

17. The ramp of claim 15, wherein one end of the biasing member is operatively attached to the lip and a second end of the biasing member is operatively attached to the frame.

18. The ramp of claim 15 further comprising an arm attached to and extending between the lip and the frame, wherein the biasing member is operatively attached to the arm biasing the lip downward relative to the ramp surface.

19. The ramp of claim 14 further comprising a resilient pad attached to the plate.

20. The ramp of claim 19, wherein the pivot axis comprises:
    a tubular member attached to the lip; and
    a channel attached to the plate wherein the tubular member pivotally engages the channel.

21. The ramp of claim 20 further comprising a rivet pivotally engaging the tubular member and the channel.

22. The ramp of claim 21 further comprising at least one bushing operatively engaging the rivet.

23. The ramp of claim 14, wherein the plate extends substantially an entire width of the frame.

24. A ramp comprising:
    a frame having a length and longitudinally spaced first and second end portions;
    a ramp surface extending transversely to and extending between the frame along at least a portion of the length;
    a plate extending at least partially between side rails of the frame adjacent to at least one of the first and second end portions;
    a lip pivotally attached to the plate at a pivot axis; and
    a biasing member biasing the lip downward relative to the ramp surface independent of a position of the ramp, wherein the lip is capable of engaging at least one of a ground surface and a vehicle.

25. The ramp of claim 24, wherein the plate includes a channel wherein the lip pivotally attaches to the plate at the channel.

26. The ramp of claim 25, wherein the biasing member is substantially housed internally within the channel.

27. The ramp of claim 25, wherein the channel is discontinuous.

28. The ramp of claim 24, wherein the lip includes a channel wherein the lip pivotally attaches to the plate at the channel.

29. The ramp of claim 28, wherein the channel is discontinuous.

30. The ramp of claim 24, wherein the plate includes a tube extending substantially a length of the plate, wherein the lip pivotally attaches to the plate at the tube.

31. The ramp of claim 30 further comprising a pivot shaft pivotally attaching the lip to the plate forming at least a portion of the pivot axis.

32. The ramp of claim 29 further comprising first and second tabs attached to the lip, the pivot shaft pivotally secured to the first and second tabs forming a portion of the pivot axis.

33. A ramp comprising:
    a frame having longitudinally spaced first and second end portions;
    at least one rung extending transversely relative to and between at least a portion of the frame, the rung forming at least a portion of a ramp surface;

a protective plate extending at least partially between side rails of the frame at either of the first and second end portions of the frame; and a lip pivotally attached to the plate at a pivot axis and biasing downward relative to the ramp surface, wherein the protective plate is load bearing and at least a majority portion of the pivot axis is not load bearing.

34. A ramp comprising:

a frame having longitudinally spaced first and second end portions;

at least one rung extending transversely relative to and between at least a portion of the frame, the rung forming at least a portion of a ramp surface; and a transition plate extending at least partially between side rails of the frame at either of the first and second end portions of the frame, wherein at least a portion of the transition plate is moveable and biased downward relative to the ramp surface.

\* \* \* \* \*